Oct. 5, 1971       RIHEI NAGANO ET AL       3,609,973
HYDRAULICALLY DRIVEN VARIABLE SPEED POWER TRANSMISSION ASSEMBLY
Filed Sept. 8, 1969       3 Sheets-Sheet 1
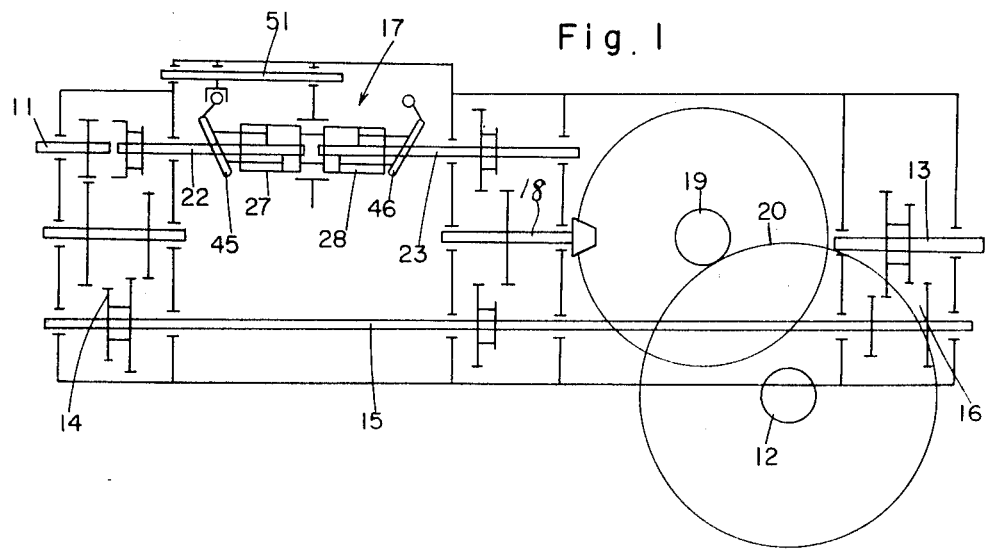
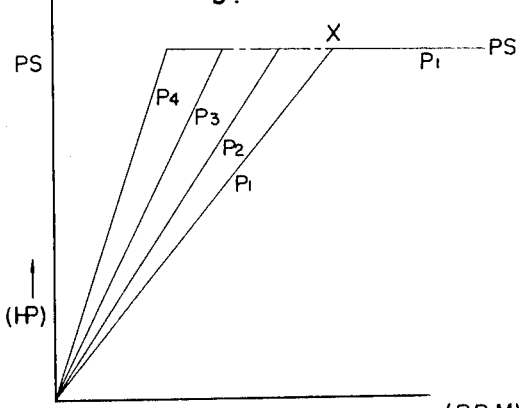
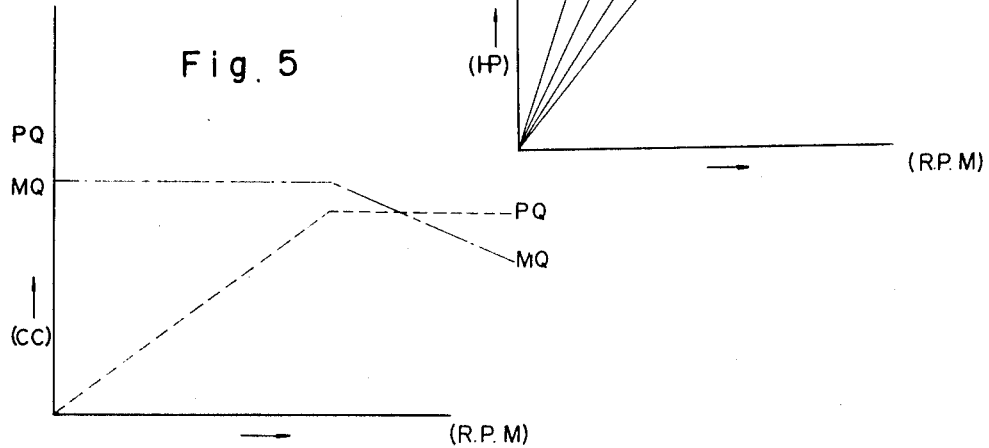

United States Patent Office 3,609,973
Patented Oct. 5, 1971

3,609,973
HYDRAULICALLY DRIVEN VARIABLE SPEED POWER TRANSMISSION ASSEMBLY
Rihei Nagano, Higashi-Osaka, and Yoshinobu Murayama, Sakai, Japan, assignors to Kubota Tekko Kabushiki Kaisha
Filed Sept. 8, 1969, Ser. No. 856,053
Claims priority, application Japan, Sept. 14, 1968, 43/66,304; Nov. 15, 1968, 43/83,934
Int. Cl. F16h 39/46
U.S. Cl. 60—53 A 4 Claims

ABSTRACT OF THE DISCLOSURE

The present invention is characterized in that in a hydraulically driven tractor for agricultural or construction work, means is provided whereby resistance to the outflow of oil from an oil discharge path for pressure regulation communicating with a high pressure-side oil path establishing fluid connection between a hydraulic pump and a hydraulic motor is automatically increased in response to a decrease in the rate of supply of oil to the hydraulic motor.

The invention eliminates the prior art disadvantage that the maximum horsepower that can be developed during low speed running is smaller than the maximum horsepower possessed by the engine itself, and the invention makes it possible to use with a minimum loss the maximum horsepower possessed by the engine itself during low speed running as well as during high speed running.

BACKGROUND OF THE INVENTION

In a hydraulically driven tractor for agricultural or construction work comprising a combination of a hydraulic pump and a hydraulic motor to effect a stepless speed change during advancing and retracting movement with a view to improving steerability, heretofore the maximum workable oil pressure that is determined by the strength of the hydraulic system and by the capacity of the engine has been set and any rise in the oil pressure above the set valve has been avoided by the use of a relief valve.

The said maximum workable oil pressure has been determined by the maximum pressure allowable with respect to the maximum rotative speed of the engine. Therefore, in the case where the engine capacity is constant and in a condition in which the engine is used without causing overloaded engine stop, low speed running could be carried out with oil pressure up to above said maximum workable oil pressure.

Generally, the set pressure for a relief valve used for preventing pressure rise has been set at said maximum workable pressure at said maximum rotative speed. Therefore, in low speed running, if said relief valve were not present pressure up to above said maximum workable pressure could be used. However, since the pressure in the relief valve is set at a lower value, as described above, the use of said higher pressures has been impossible and only a part of the engine capacity has been practically utilized. In hydraulic drive mechanisms of the prior art type which, by utilizing a combination of a plunger type hydraulic pump and a hydraulic motor and changing the angle of inclination of the plunger support swashplate on the pump side, changes the amount of plunger stroke to increase or decrease the amount of oil discharge per revolution from the pump, in the case where the pressure of oil supplied to the hydraulic motor is constant, as shown in FIG. 4, wherein the horizontal axis represents the hydraulic motor-side shaft rotative speed (r.p.m.) or the traveling speed (km./hr.) of the machine and the vertical axis represents the driving horsepower $P_s$ (H.P.) of the mounted engine, then as the rotative speed of the hydraulic motor is increased the driving horsepower $P_s$ is increased but when it reaches the maximum horsepower value, no greater horsepower can be derived; thus the horsepower assumes a constant value. FIG. 5 shows the relations between the shaft rotative speed on the hydraulic motor side and the displacement PQ (cc.) of the hydraulic motor when the cylinder block performs one complete revolution, or the displacement MQ (cc.) of the hydraulic motor. The amount of stroke of each plunger in the cylinder block is maximum when the angle of inclination of the plunger support swashplate is maximum, and in this case the amount of discharge of oil is also maximum.

Therefore, as the angle of inclination of the plunger support swashplate is maximized, the displacement PQ at constant pressure on the hydraulic pump side is maximized. Thus, after the angle of inclination reaches its maximum, the displacement PQ remains unchanged, and a further increase in the shaft rotative speed of the hydraulic motor is brought about only by the amount of stroke of the plungers on the hydraulic motor side. As contrasted therewith, concerning the MQ on the hydraulic motor side, the greater the amount of stroke of each plunger, the slower the rotative speed; conversely, the smaller the amount of stroke, the faster the rotative speed, this being in reverse relation to PQ. During the angle of inclination of the swashplate on the hydraulic pump side being small in such conditions of use, that is, during low speed running with a lower value for the shaft rotative speed on the hydraulic motor side, it means that the tractor driving horsepower derivable from the mounted engine is decreased.

For agricultural tractors required to exert a very strong power in drawing various working machines, this is a point which needs improving, and forms the cause of bringing about a decrease in the starting torque at the time of starting the machine. Therefore, in the case where the oil pressure used is constant, it is necessary to change the cylinder volume ratio between the hydraulic pump side and the hydraulic motor side, which is disadvantageous from the standpoint of machine design and working.

SUMMARY OF THE INVENTION

The present invention relates to a hydraulically driven variable speed power transmission assembly including a hydraulic variable displacement pump driven by an engine, a tractor axle driving hydraulic variable displacement motor driven by high pressure oil discharged from said hydraulic pump, an oil discharge path for pressure regulation communicating with a high pressure-side oil path extending from said hydraulic pump to said hydraulic motor, and resistance change means for increasing resistance to the outflow of oil from said oil discharge path in response to a decrease in the amount of discharge of oil to the hydraulic motor per revolution of said hydraulic pump.

An object of the invention is to provide an optimum power transmission mechanism for tractors for agricultural and construction work required to exert a very strong driving power during low speed running, wherein in the case where the amount of discharge of oil to a hydraulic motor per revolution of a hydraulic pump is decreased, resistance to the outflow of oil from an oil discharge path for pressure regulation communicating with a high pressure-side path is increased thereby operatively increasing the pressure of the oil being discharged to the hydraulic motor through the high pressure-side path to prevent any decrease in the tractor driving power during low speed running. Thereby the invention provides a hydraulically driven variable speed tractor power transmission device which is capable of increasing the starting torque at the time of starting the machine and preventing overloading on the engine with respect to the working speed at the time of that running and which, moreover, is capable of effectively utilizing the engine capacity regardless of the amount of loads.

A further object is to provide a hydraulically driven variable speed tractor power transmission device wherein said resistance change means is so constructed as to reduce the cross-sectional area of an oil discharge path for pressure regulation communicating with a high pressure-side path by means of an operative member such as a notched means thereby making it possible to increase the discharge pressure operatively and easily.

BRIEF DESCRIPTION OF THE DRAWINGS

FIG. 1 is an explanatory view of the entire layout of an embodiment of the present invention;

FIG. 4 is a working characteristic diagram showing the relations between the driving horsepower of a mounted engine and the traveling speed of the machine according to the invention;

FIG. 5 is a working characteristic diagram showing the relations between the respective displacements per revolution of a hydraulic pump and a hydraulic motor and the traveling speed of the machine.

DESCRIPTION OF THE PREFERRED EMBODIMENTS

Embodiment 1

Figure 2:
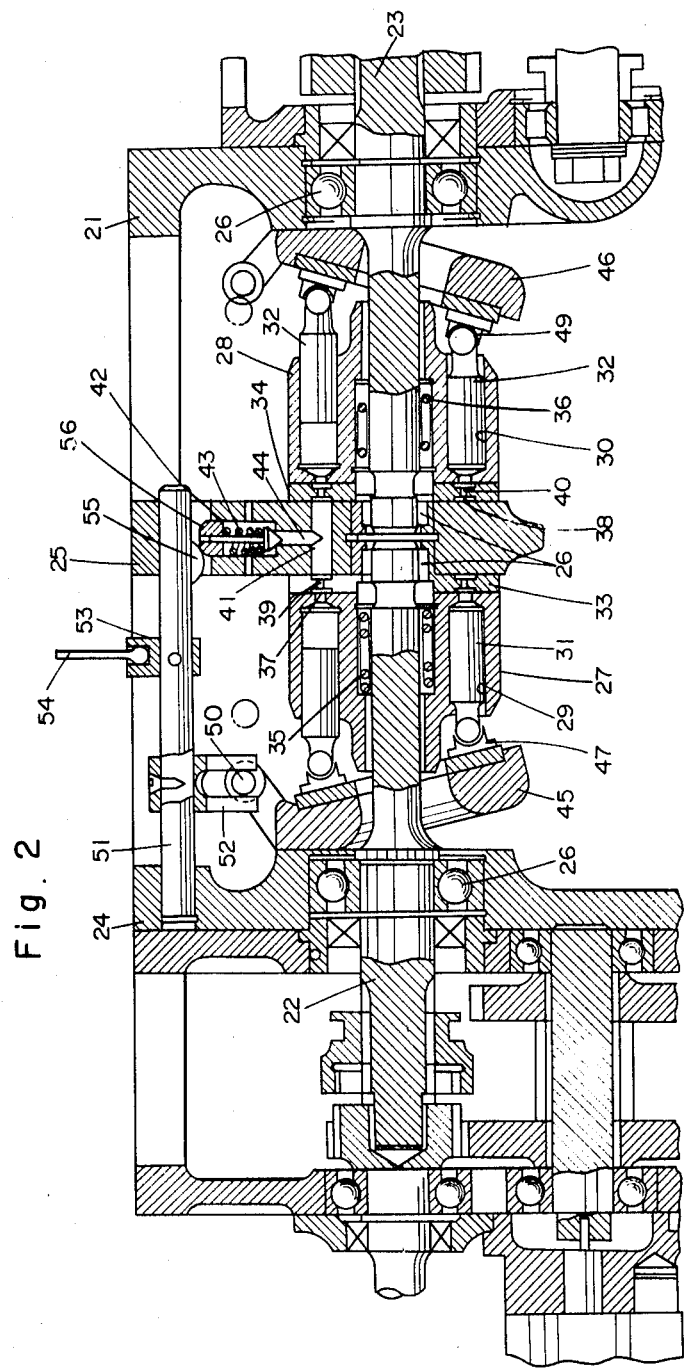
FIG. 2 is a longitudinal section of the principal portion of a variable speed mechanism according to the invention.

In FIG. 1, the numeral 11 denotes a power shaft extending from a tractor-mounted engine through a clutch; 12, a tractor traveling rear axle driven by a bevel gear through a final reduction gear; 13, a tractor rear power take-off shaft; 14, a reduction gear for two-stage variable speed provided at the foremost portion of a tractor transmission casing; 15, a power through-shaft driven by said reduction gear 14 to transmit power to a power-take-off shaft reduction gear 16 at the rearmost portion; and 17 denotes a variable speed device which operates on the principles of a variable oil pressure drive, said device being described later in more detail.

The numeral 18 denotes a bevel pinion shaft operatively connected to said variable speed device 17 and also to the power through shaft 15, which bevel pinion shaft 18 carries a bevel pinion for rotating the traveling rear axle 12 through final reduction gear wheels such as bevel wheels 19 and 20. This however, illustrates only one example of a power transmission device using the present invention and the various operative connections other than the variable speed device 17 may be freely designed in any other way than the illustrated one.

The details of the variable speed device 17 are as shown in FIG. 2, wherein the numeral 21 denotes a support case for the entire variable speed device; 22, a driving shaft for a hydraulic plunger pump, which driving shaft is driven for rotation by said power shaft; and 23 denotes a power shaft for a hydraulic motor separately provided to be opposed to and coaxial with said driving shaft 22, both of said shafts being rotatably supported in bearings 26 in the opposed lateral walls 24, 24 and intermediate partition wall 25 of the case 21. The numeral 27 denotes a cylinder block on the hydraulic pump side and 28 denotes a cylinder block on the hydraulic motor side, both being fixedly secured to their respective shafts 22 and 23. The blocks 27 and 28 have a suitable number of radially arranged cylinders 29 and 30 of the same shape and same capacity, respectively, and the cylinders 29 and 30 have plungers 31 and 32, respectively, inserted therein in such a manner as to be free to advance and retract. Between the opposed lateral surfaces of the intermediate partition wall 25 and the respective end surfaces of the cylinder blocks 27 and 28, there are sealingly inserted valve plates 33 and 34 through springs 35 and 36. The valve plates 33 and 34 have one of their respective surfaces opposed to the cylinders 29 and 30 formed with an oil groove 37 and have the other respective surfaces opposed to the intermediate partition wall 25 formed with an oil groove 38, said oil grooves 37 and 38 being adapted to communicate with oil holes 39 and 40, respectively, and also with the respective cylinders 29 and 30 of the blocks 27 and 28, respectively. An oil path 41 communicating with the respective oil grooves 37 and 38 of the valve plates 33 and 34 is provided locally in the intermediate partition wall 25. In an oil discharge path 44 communicating with said oil path 41, there is inserted a discharge safety valve 42 through a spring 43.

On the other hand, correspondingly to the respective plungers 31 and 32 of the cylinder blocks 27 and 28, plunger support swashplates 45 and 46 are loosely fitted on the shaft 22 and 23, respectively, in such a manner as to be free to be tilted. The swashplate 45 on the hydraulic pump side carries a rotary guide part 47 which is engaged by the plungers 31 and the swashplate 46 on the hydraulic motor side similarly carries a rotary guide part 49 which is engaged by the plungers 32. One end of the plunger support swashplate 45 on the hydraulic pump side is provided with a shift pin 50 which is engaged by a fork 52 on a slide shaft 51 slidably provided by utilizing the lateral wall 24 and the intermediate partition wall 25, said slide shaft 51 being slid by means of a shift fork 53 and shift lever 54 and being formed locally with a cam 55 engaged by a spring holder 56 slidably fitted in said discharge safety valve 42, so that the movement of the cam 55 causes the spring holder 56 to move up and down, thereby making the valve pressure of the spring 43 adjustable. In addition, the illustrated structure of the spring holder 56 and cam 55 is, of course, an example only, and they may be freely designed as long as they can continuously change the urging force on the discharge safety valve 42 in accordance with variations in the angle of inclination of the swashplate 46.

The function of the present invention will now be described. The power shaft 11 is rotated for input by the mounted engine through a clutch, etc., and the drive shaft 22 on the hydraulic pump side is rotated by the power shaft 11 similarly through a clutch, etc., so that the cylinder block 27 is rotated and the individual plungers 31 in the cylinders 29 are advanced and retracted, each making one complete reciprocating motion per revolution, whereby the pressure oil in each cylinder is fed through the oil groove 37, oil hole 39, oil groove 38, oil path 41, oil groove 38, oil hole 40 and oil grove 37 into the corresponding cylinder 30 of the cylinder block 28 on the hydraulic motor side, so that the individual plungers 32 supported by the swashplate 46 are reciprocated in accordance with the angle of inclination of the swashplate 46 to rotate the block 28, thereby operatively rotating the power shaft 23 on the motor side, the rotation of the power shaft 23 resulting in driving the bevel pinion shaft 18 and other members. In this case, the vertical position of the support swashplate 45 on the pump side provides a stop position for the cylinders 29 because of zero stroke, and when the swashplate 45 has the maximum angle of inclination as shown in FIG. 2, the amount of stroke is maximum and hence the pump displacement is also maximum, thus providing the maximum speed for forward movement, for example. As shown in FIG. 2, when the swashplate 46 is in its maximum angle position, the amount of stroke of the plunger 32 in each cylinder 30 is maximum, which means low speed since as shown, swashplate 46 is in its maximum position. It is apparent that if the angle of inclination of the swashplate 46 is decreased to decrease the amount of stroke of the plunger 32, this will result in high speed transmission. Therefore, by gradually decreasing the angle of inclination of the support swashplate 45 on the hydraulic pump side toward the vertical stop position of the swashplate through the movement of the shift lever 54, shift fork 53, shift slide shaft 51 and fork 52, the pump displacement is gradually decreased. At the same time, the cam 55 annexed to said slide shift shaft 51 moves to the right as viewed in FIG. 2 and gradually depresses the spring holder 56 by the camming raised surface, so that the spring 43 is compressed with gradually increasing strength, thus increasing the strength with which the discharge safety valve 42 is urged against the regulating valve hole 44. That is to say, increasing the urging force on the discharge safety valve 42 in this way will result in increasing the discharge pressure on the pump side.

The respective cylinders 29 and 30 are the same in number, shape and size and since some of them are in constant communication with each other through the respective oil grooves in the valve plates 33 and 34 and through the oil path 41, the amount of pressure oil as a whole moving to the motor side is invariable. Therefore, in the case where the plungers 31 make one complete reciprocating motion through the swashplate 45 each time the cylinders 29 on the pump side make one complete revolution, the amount of stroke of each plunger 31 increases with an increase in the angle of inclination of the swashplate 45 and the movement of the discharge pressure oil quickens the stroke of the plunger 32 in each cylinder 30 on the motor side and since one complete revolution thereof is made in a shorter time, the rotative speed of the cylinder block 28 and the power shaft 23 integral therewith becomes faster. Conversely, if the amount of stroke of the plungers 31 on the pump side is gradually decreased by gradually decreasing the angle of inclination of the swashplate 45, the stroke of the plungers 32 on the motor side is slowed down, so that the rotative speed of the power shaft 23 can be gradually decreased. Thus, stepless speed change can be made by gradually increasing or decreasing the angle of inclination of the swashplate 45 on the pump side by the shift lever 54, but, in this case, in gradually decreasing the speed by gradually decreasing the angle of inclination of the swashplate 45 in the described manner, the urging pressure on the discharge safety valve 42 adjusted to a constant pressure valve is gradually increased as the cam 55 is moved to depress the spring holder 56, whereby the discharge pressure on the pump discharge side during low speed can be operatively increased thereby to increase the driving horsepower during low speed. In the case where said discharge safety valve 42 is maintained under a constant adjusted pressure, even when the displacement on the pump side is decreased as described above, the adjusted constant pressure would be still maintained and this would naturally cause a decrease in the driving horsepower during low speed, but such a drawback can be eliminated by the present invention. As is apparent from a characteristic diagram shown in FIG. 4, in the case where point X indicates a point where the driving horsepower PS is maximum when the angle of inclination of the swashplate 45 is maximum, the performance curves can be improved successively as indicated by $P_1$ through $P_4$ by increasing the urging pressure on the discharge safety valve 42 as the speed is decreased, so that it becomes possible to increase the driving horsepower during low speed and in this way the starting torque at the time of starting the machine can also be increased. Further, since it is unnecessary to vary the capacity ratio between the hydraulic pump and the hydraulic motor according to a change in the speed, the engine is prevented from being overloaded in the entire speed range of from low to high speed. In attaining high speed by increasing the angle of inclination of the swashplate 45 on the hydraulic pump side, the provision of the safety valve 42 makes it possible to keep the working oil pressure low during high speed and to improve the efficiency of use and durability. It is possible to eliminate the disadvantages inherent in this type of conventional variable speed mechanisms caused by the use of a hydraulic pump and hydraulic motor arrangement whose capacity ratio has to be varied according to a change in the speed. The invention is most suitable and has superior effects as a power transmission mechanism for tractors for agricultural and construction work required to perform various operations and to exert a very strong driving power during low speed.

Embodiment 2

Figure 3:
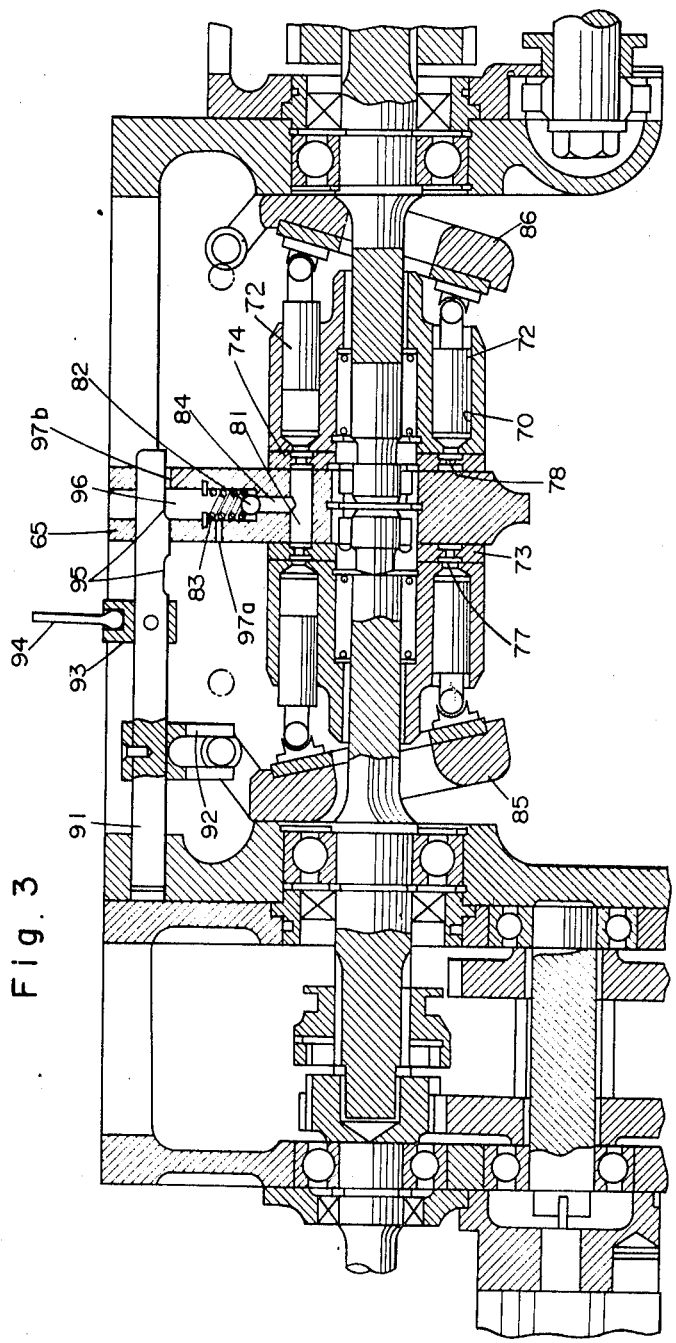
FIG. 3 is a longitudinal section of the principal portion of a variable speed mechanism in another embodiment of the invention.

As shown in FIG. 3, an oil path 81 communicating with oil grooves 77 and 78 in a valve plate 73 on the hydraulic pump side and in a valve plate 74 on the hydraulic motor side, respectively is provided in an intermediate partition wall 65. In an oil discharge path 84 immediately communicating with said oil path 81, there is inserted a discharge safety valve 82 against a spring 83.

Restrictive apertures or bleed holes 97a, b communicate the discharge path 84 with an oil reservoir (not shown). Notches 95 on shift shaft 91 are arranged to gradually reduce the total cross-sectional area of the apertures 97a, b to a suitable minimum value, when the pump displacement decreases to zero.

The notches 95 gradually close the aperture 97b, when the shift shaft 91, to reduce the variable pump displacement, is slid forward in joint cooperation with the titltable member 85 regulating the pump displacement.

The shift shaft 91 is provided with a shift fork 92, which engages a protruding part or pin of the tiltable pump displacement member 85.

The position of the shift shaft 91 and the tiltable pump displacement member 85 is regulated by a shift lever 94 mounted on the slidable shift shaft 91 by means of a shift fork 93.

When the pump displacement is decreasing to zero, the oil pressure in the oil path 81 can be kept at a satisfactory level. When the aperture 97b is completely closed, the oil escapes under maximum pressure through the aperture 97a.

The function of the present invention will now be described. When the titltable member or swashplate 85 has the maximum angle of inclination, the amount of stroke is maximum and the pump displacement is also maximum so that for example the maximum speed for forward travel is produced. When the angle of inclination of the swashplate 86 on the hydraulic motor side is maximum, the amount of stroke of the plunger 72 in each cylinder 70 is maximum, which means low speed, it being apparent that if the amount of stroke of the plungers 72 is decreased by gradually decreasing the angle of inclination of the swashplate 86, high speed transmission is produced. Therefore, by gradually decreasing the angle of inclination of the swashplate 85 on the hydraulic pump side by means of the movement of the shift lever 94, shift fork 93, shift slide shaft 91 and fork 92 until the swashplate almost reaches its vertical stop position, the pump displacement is gradually decreased and the speed is slowed down. At the same time, the spool notches 95 provided in said slide shift shaft 91 are moved to the right as viewed in FIG. 3, whereby the aperture or bleed oil hole 97b is decreased in area so that the oil pressure in the oil path 81 is gradually increased. Thus, by increasing the oil pressure in the oil path in this way the discharge pressure on the pump side will be increased. Therefore, the same merits as those described in the FIG. 2 embodiment can be achieved.

We claim:

1. A hydraulically driven variable speed power transmission assembly including a hydraulic variable displacement pump driven by an engine, a hydraulic variable displacement motor driven by, i.e., fluid pressurized by, said pump, and relief means connected with an oil path between said hydraulic pump and said hydraulic motor, said relief means being in immediate communication with the high pressure side of the oil path and comprising an oil discharge path, a discharge safety valve inserted in said discharge path, restrictive apertures communicating said discharge path with an oil reservoir, and means for gradually reducing the total cross-sectional area of the apertures to a suitable minimum value when the pump displacement decreases to zero.

2. A hydraulically driven variable speed power transmission assembly as claimed in claim 1, wherein the means for gradually reducing the total cross-sectional area of the restrictive apertures comprises a slidable shift shaft including notched means; said notched means arranged to gradually close at least one of the restrictive apertures when the shift shaft, to reduce the variable pump displacement, is slid forward in joint cooperation with a tiltable member regulating the pump displacement.

3. A hydraulically driven variable speed power transmission assembly as claimed in claim 2, wherein the shift shaft is provided with a shift fork, said fork being arranged to engage a protruding part of the tiltable pump displacement member.

4. A hydraulically driven variable speed power transmission assembly as claimed in claim 2, wherein the position of the shift shaft and the tiltable pump displacement member is regulated by a shift lever mounted on the shift shaft by means of a shift fork.

References Cited

UNITED STATES PATENTS

| 2,343,386 | 3/1944 | Poitras et al. | 60—53 AX |
| 3,053,043 | 9/1962 | Knowler | 60—52 VSPX |

FOREIGN PATENTS

| 183,598 | 7/1922 | Great Britain | 60—53 A |

EDGAR W. GEOGHEGAN, Primary Examiner

U.S. Cl. X.R.

60—52 VS